United States Patent
Findle et al.

[11] Patent Number: 6,161,693
[45] Date of Patent: Dec. 19, 2000

[54] REUSABLE DISPLAY PACKAGE FOR CIRCULAR BLADE OR OTHER DISPLAY ITEM

[75] Inventors: Daniel G. Findle, White Hall, Md.; David A. Evans, Sr., Hanover, Pa.; Dennis L. Chyba, Baltimore, Md.

[73] Assignee: Black & Decker Inc., Newark, Del.

[21] Appl. No.: 09/304,028

[22] Filed: May 3, 1999

[51] Int. Cl.⁷ ..................................................... A45C 11/26
[52] U.S. Cl. .................... 206/349; 206/493; 206/459.5; 206/232; 206/469; 206/470
[58] Field of Search ..................... 206/349, 806, 206/303, 308.1, 493, 465, 469, 470, 472, 232, 459.5; 220/4.23

[56] References Cited

U.S. PATENT DOCUMENTS

| | | |
|---|---|---|
| 1,500,136 | 7/1924 | Knowlton . |
| 1,585,846 | 5/1926 | Frisbie . |
| 2,950,004 | 8/1960 | Acomb . |
| 3,053,424 | 9/1962 | Reinhard ................................. 206/349 |
| 3,109,539 | 11/1963 | Turoff . |
| 3,259,231 | 7/1966 | Romanowski et al. .................. 206/349 |
| 3,534,358 | 10/1970 | Stern . |
| 3,596,822 | 8/1971 | Holley ..................................... 206/349 |
| 3,776,375 | 12/1973 | Rohdin . |
| 3,825,112 | 7/1974 | Shumaker et al. . |
| 3,899,100 | 8/1975 | Rigaud . |
| 3,949,872 | 4/1976 | Paudras . |
| 4,005,776 | 2/1977 | Seeley . |
| 4,020,694 | 5/1977 | Mayhew . |
| 4,084,690 | 4/1978 | Pulse . |
| 4,324,331 | 4/1982 | Ignasiak . |
| 4,327,512 | 5/1982 | Oliver ..................................... 206/303 |
| 4,449,629 | 5/1984 | Barrieau . |
| 4,499,353 | 2/1985 | Shields . |
| 4,588,082 | 5/1986 | Ridings . |
| 4,619,364 | 10/1986 | Czopor, Jr. . |
| 4,681,223 | 7/1987 | Roberts ................................... 206/354 |
| 4,687,129 | 8/1987 | Cugley . |
| 4,702,373 | 10/1987 | Meade . |
| 4,872,551 | 10/1989 | Therus .................................... 206/349 |
| 4,877,130 | 10/1989 | Matuz . |
| 4,895,252 | 1/1990 | Nomula et al. ......................... 206/310 |
| 4,903,829 | 2/1990 | Clemens . |
| 4,921,096 | 5/1990 | McFarlane . |
| 5,078,266 | 1/1992 | Rackley .................................. 206/349 |
| 5,133,454 | 7/1992 | Hammer . |
| 5,209,354 | 5/1993 | Thornhill et al. . |
| 5,238,107 | 8/1993 | Kownacki . |
| 5,293,993 | 3/1994 | Yates, Jr. et al. ...................... 206/365 |

(List continued on next page.)

FOREIGN PATENT DOCUMENTS

| | | |
|---|---|---|
| 0 559 443 B1 | 8/1993 | European Pat. Off. . |
| 820419 | 11/1951 | Germany . |

*Primary Examiner*—Paul T. Sewell
*Assistant Examiner*—Shian Luong
*Attorney, Agent, or Firm*—Harness, Dickey & Pierce P.L.C.

[57] ABSTRACT

A reusable package is provided for displaying and storing a display item, such as a cutting blade. The package includes front and rear body portions hingedly interconnected with each other. Closure portions are formed in the front and rear body portions and are mutually engageable in a gripping and releasable relationship through a central aperture on the display item when the body portions are in their closed position. At least one of the body portions includes an anti-rotation lug that is engageable with a surface discontinuity on the display item, such as a space between adjacent teeth on a cutting blade, thus preventing the display item from rotating when the package is closed. Preferably the other body portion includes a second anti-rotation lug located at a different location relative to the closure portions so that the package can be used to display and store at least two different, but similar display items. In a preferred form of the present invention, the front and rear body portions each include dished "clam-shell" portions nestably engageable with each other and a shallow cavity therebetween, in which display cards, anti-theft security devices, or small accessories may be housed. The front and rear body portions can be repeatedly opened and closed after a frangible initial attachment has been broken.

20 Claims, 4 Drawing Sheets

U.S. PATENT DOCUMENTS

| | | |
|---|---|---|
| 5,322,162 | 6/1994 | Melk . |
| 5,456,057 | 10/1995 | Bannon et al. . |
| 5,540,324 | 7/1996 | Knapp ........................................ 206/6.1 |
| 5,586,657 | 12/1996 | Ward et al. . |
| 5,595,295 | 1/1997 | Lin . |
| 5,601,188 | 2/1997 | Dressen et al. . |
| 5,653,335 | 8/1997 | Bauer et al. ......................... 206/307.1 |
| 5,713,463 | 2/1998 | Lakoski et al. . |
| 5,803,253 | 9/1998 | Zakarian ................................. 206/349 |
| 5,823,350 | 10/1998 | Ward . |
| 5,871,100 | 2/1999 | Ward . |
| 5,878,886 | 3/1999 | Marshall . |

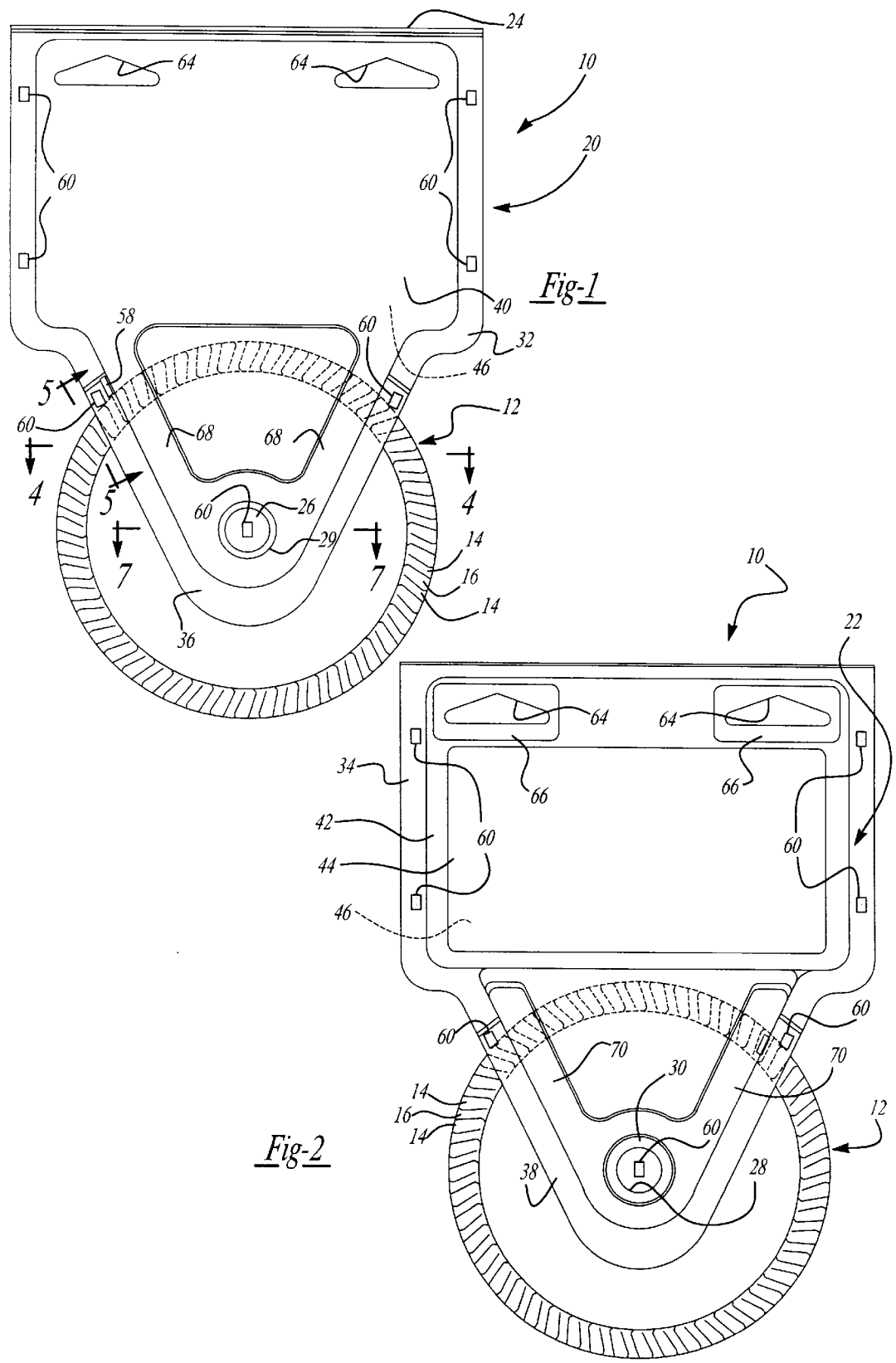

REUSABLE DISPLAY PACKAGE FOR CIRCULAR BLADE OR OTHER DISPLAY ITEM

BACKGROUND AND SUMMARY OF THE INVENTION

The invention relates generally to display packages for circular cutting blades, similar disk-like products, or other display items. More particularly, the invention relates to such packages that are intended to be reused for storing or holding the blade or other item after being initially opened by the user.

This application is related to an application entitled "REUSABLE DISPLAY PACKAGE FOR SHANKED TOOL OR OTHER DISPLAY ITEM", filed of even date herewith.

Various packaging devices and arrangements for circular cutting blades or other similar display items have been provided in the past. Such previous packages include skin packs, blister packs, shrink-wrapped and card-mounted packages, as well as other similar arrangements. These packages have frequently been found to be difficult to open without destroying or severely damaging the packaging, thus rendering the package unusable for post-opening storage or carrying by the user. Such packages have also been expensive and wasteful and have often been composed of materials that are difficult or impossible to recycle. In addition, many of such previous packages have inhibited the viewer's ability to easily see, feel and evaluate the product being displayed. Furthermore, such prior packages have usually been dedicated packages usable with only one display item, thus requiring different display packages for each of a number of different display items, even though such display items are very similar to one another.

According to the present invention, a reusable package is provided for displaying, holding and/or storing a display item, such as a circular cutting blade, for example, where the display item has a central aperture therethrough and at least one surface discontinuity thereon. The preferred reusable package includes front and rear body portions hingedly interconnected with each other in order to be selectively foldable between a fully closed generally face-to-face position and a fully open separated position. The preferred package includes complementary closure portions formed in the front and rear body portions, with the closure portions being mutually engageable in a gripping and releasable relationship within and through the central aperture of the display item when the front and rear body portions are folded to their closed position. At least one of the front or rear body portions includes an anti-rotation lug protruding inwardly therefrom to be engageable with the surface discontinuity on the display item, such as a space between adjacent teeth on a cutting blade, for example, thus substantially preventing the display item from rotating about its central aperture when the package is closed. Preferably the other body portion includes a second anti-rotation lug located at a different location relative to the closure portions so that the package can be used to display, hold and store at least two different, but similar display items.

In a preferred form of the present invention, the front and rear body portions each include a header portion and a depending triangular support portion with the respective front and rear header portions and the respective front and rear triangular support portions being generally complementary in size and shape to each other and being mutually engageable with each other when the body portions are in the closed position. The front and rear header portions include respective dished or recessed "clam-shell" portions releasably and nestably engageable with each other when the package is in its closed position. Preferably the rear header portion also includes a second rear dished portion formed therein but opening generally forwardly (opposite that of the front dished portion) when the front and rear body portions are in the closed position, with the second rear dished portion being generally surrounded by the first rear dished portion. Since the second rear dished portion has its open side facing toward the open side of the front dished portion, they form a shallow cavity therebetween, in which display cards, anti-theft security devices, or small accessories, for example, may be housed or stored.

Preferably the closure portions include a closure post on one of the front or rear body portions and the closure recess on the other of the front or rear body portions with the post and recess being grippingly and releasably engageable with each other through the display item's central aperture when the package is in its closed position, thus allowing the user to repeatedly open and close the package after initially opening it. The front and rear body portions are initially attached to each other (such as by ultrasonic welding for example) to secure them in their closed position with the display item disclosed therebetween. This initial attachment is frangible and easily broken by the user in order to allow the front and rear body portions to be unfolded from each other for initial removal of the display item. After such initial opening and removal, the above-described closure portions are grippingly and releasably nestable with each other, within and through the central aperture of the display item, in order to allow the front and rear body portions to be repeatedly and releasably secured in their closed position after the frangible initial attachment has been broken.

In addition, in the preferred form of the present invention, at least one hang-hole is provided through each of the front and rear body portions, with the hang-holes being aligned with each other when the package is in its closed position in order to allow the package to be hung on a peg, hook, nail, or other external protruding member. In order to enhance the durability of the reusable package according to the present invention, such hang-holes, and preferably the closure post and recess, are reinforced by surrounding bosses.

Additional objects, advantages, and features of the present invention will become apparent from the following description and the appended claims, taken in conjunction with the accompanying drawings.

BRIEF DESCRIPTION OF THE DRAWINGS

FIG. 1 is a front elevation view of a reusable package according to the present invention shown in its closed configuration.

FIG. 2 is a rear elevation view of the reusable package shown in FIG. 1.

FIG. 6a is a partial cross-sectional view similar to that of FIG. 6, but taken generally along line 6a—6a of FIG. 5a.

DETAILED DESCRIPTION OF THE PREFERRED EMBODIMENTS

Figure 3:
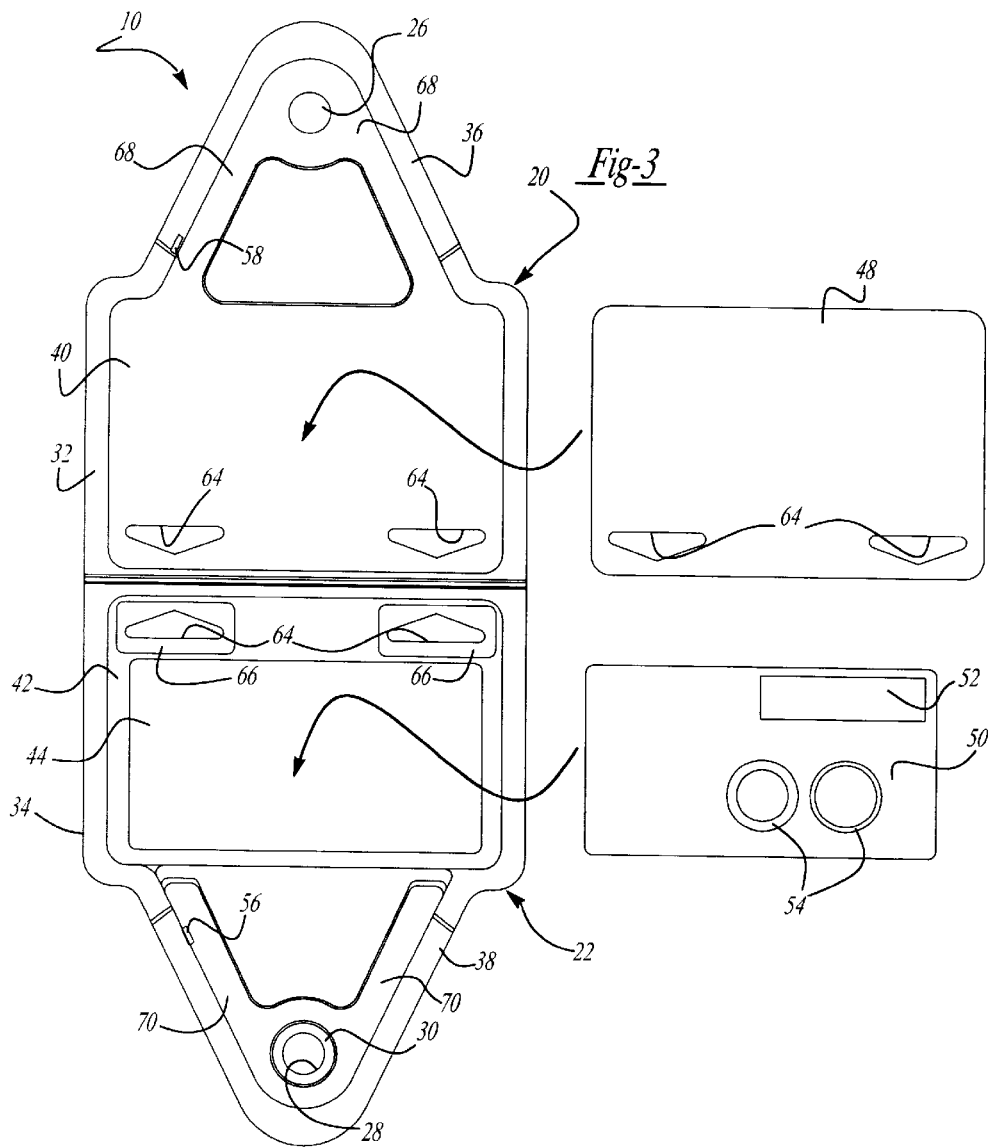
FIG. 3 is a partially exploded view of the preferred reusable display item according to the present invention, shown in its open configuration.
Figure 4:
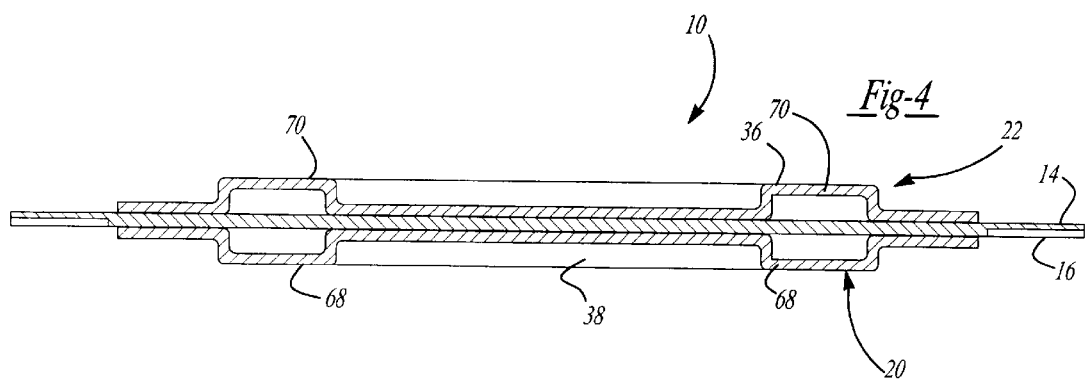
FIG. 4 is a cross-sectional view, taken generally along the line 4—4 of FIG. 1.

FIGS. 1 through 7 illustrate and depict one exemplary preferred embodiment according to the present invention, wherein a display package 10 is adapted for holding, storing and displaying a cutting blade 12 (or a different cutting blade 12a) is illustrated. One skilled in the art will readily recognize that the reusable display package 10 is shown merely for purposes of example and that the principles of the present invention are equally applicable to display packages of other shapes, sizes and configurations than that shown in the drawings and, to such packages for display items other than cutting blades.

Referring initially to FIGS. 1 through 4, the reusable display package 10 is shown for displaying, holding and storing a cutting blade 12 having a number of cutting teeth 14 spaced about its radial periphery with spaces 16 lying between adjacent pairs of cutting teeth 14. The reusable display package 10 includes a front body portion 20 and a rear body portion 22 foldably interconnected by a living hinge 24 to allow the front and rear body portions 20 and 22 to be foldably opened and closed between the closed position shown in FIGS. 1, 2 and 4 and the open position shown in FIG. 3. Preferably, both of the front and rear body portions 20 and 22 are substantially transparent.

Figure 7:
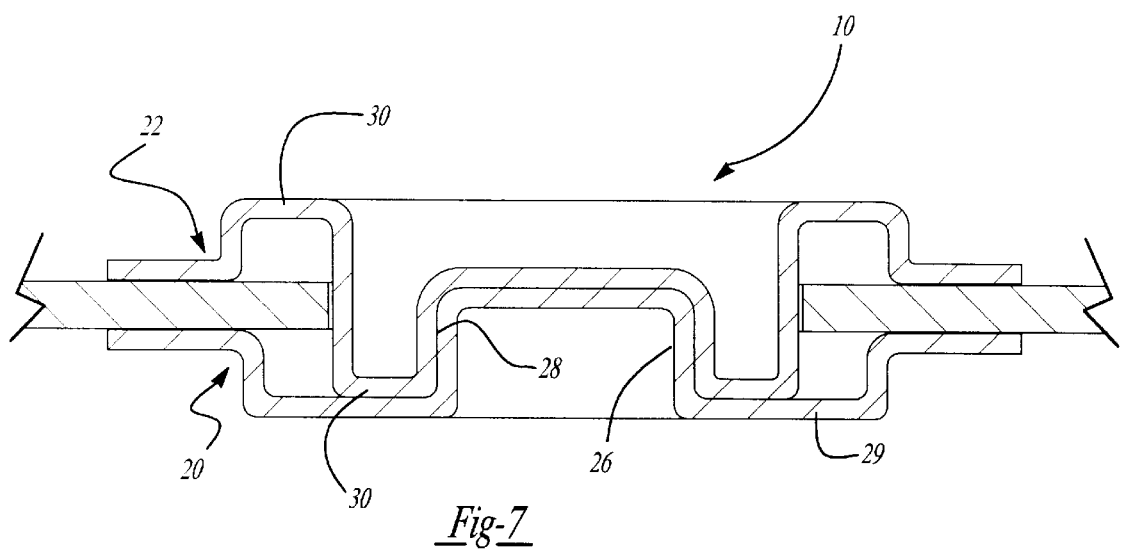
FIG. 7 is a partial cross-sectional view taken generally along line 7—7 of FIG. 1.

A closure post 26 is formed in the front body portion 20, with a complementary closure recess 28 being formed in the rear body portion 22 (also seen in FIG. 7). Thus, once the display package 10 has been initially opened, it can be repeatedly and releasably secured in its closed position by a gripping and releasably nestable engagement of the closure post 26 within the closure recess 28. Preferably a reinforcing boss 29 surrounds the closure post 26, and a similar reinforcing boss 30 surrounds the closure recess 28, in order to enhance the durability of the display package 10. It should be noted, in this regard, that the closure post 26 and the closure recess 28 may alternatively be formed in the rear body portion 22 and the front body portion 20, respectively, rather than as shown in the drawings.

The front body portion 20 preferably includes a generally rectangular front header portion 32 and a depending front triangular portion 36. Similarly, the rear body portion 22 preferably includes a generally rectangular rear header portion 34 and a depending rear triangular portion 38. The front header portion 32 has a front dished portion formed therein, and the rear header portion 34 has a similar first larger rear dished portion 42 formed therein, with the dished portions 40 and 42 both facing in the same direction when the display package 10 is in its closed position in order to releasably nest within each other. A second smaller rear dished portion 44 is formed within the first rear dished portion 42 of the rear header portion 34, with the second rear dished portion opening in an opposite direction from that of the front dished portion when the display package 10 is in its closed position, thereby forming a cavity 46 therebetween. One or more insert cards, such as the first insert card 48 and the second insert card 50, shown in FIG. 3, can be housed within the cavity 46 and can include information about the cutting blade 12 or other display item printed thereon. The cavity 46 can also house a magnetic or other similar anti-theft security device 52, which can be concealed between the first and second insert cards 48 and 50. Arbor inserts 54 or other such accessories can also be housed within the cavity 46.

Figure 5:
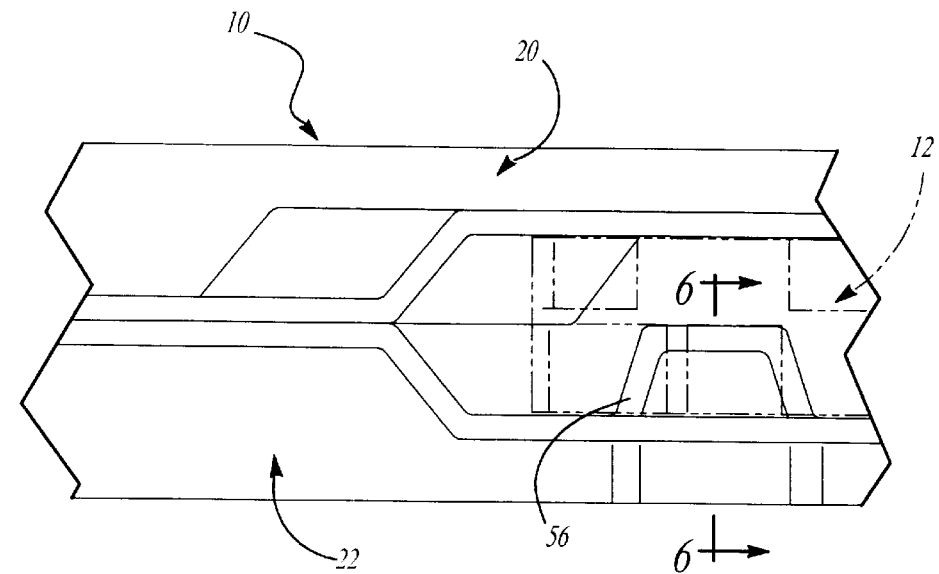
FIG. 5 is a partial cross-sectional view taken generally along line 5—5 of FIG. 1, showing the engagement of one of the anti-rotation lugs engaging a space between adjacent teeth on a cutting blade display item.
Figure 6:
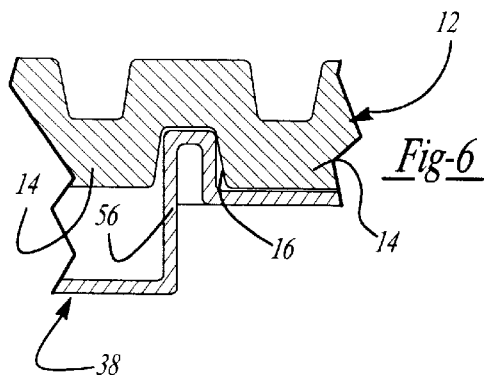
FIG. 6 is a partial cross-sectional view taken generally along line 6—6 of FIG. 5.
Figure 5A:
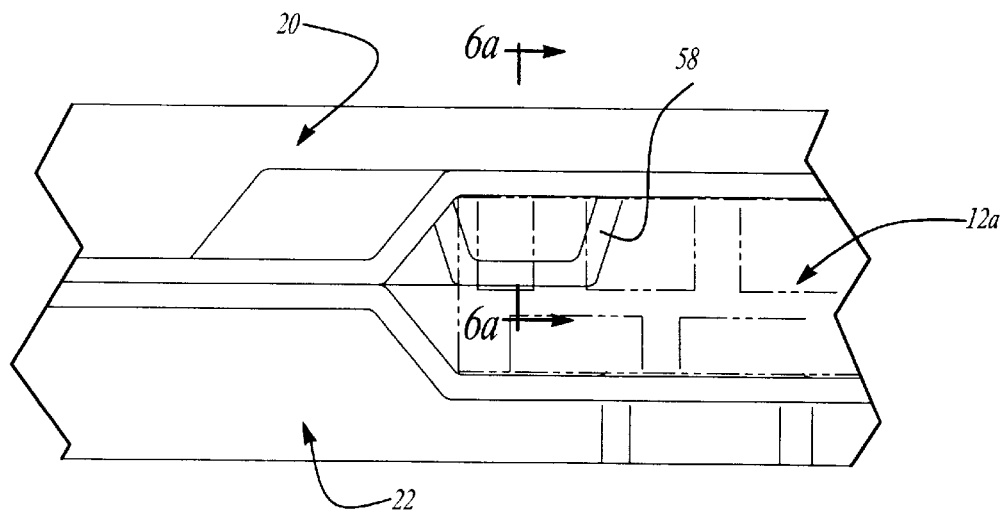
FIG. 5a is a partial cross-sectional view similar to that of FIG. 5, but showing the engagement of the other anti-rotation lug with a space between adjacent teeth of the second cutting blade display item of a different diameter.
Figure 6A:
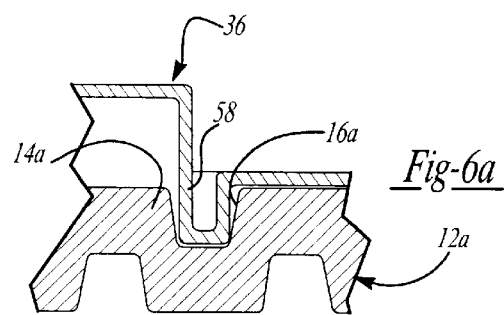

In order to retain the cutting blade 12 or other display item in its proper orientation, a first anti-rotation lug 56 is formed on the rear triangular portion 38 and is engageable with a surface discontinuity, such as the tooth space 16 between adjacent teeth 14 of the cutting blade 12, as is shown in FIGS. 5 and 6. This retains the cutting blade 12 or other display item in an orientation such that any information printed thereon is properly oriented, for example. As shown in FIGS. 5a and 6a, a second anti-rotation lug 58 is formed on the rear triangular portion 36 and is located at a location farther from the closure post 26 and the closure recess 28 than that of the first anti-rotation lug 56. This allows the display package 10 to be used with at least two different cutting blades 12 and 12a. These first and second anti-rotation lugs 56 and 58 can, of course, alternately be formed on the front and rear triangular portions 36 and 38, respectively, rather than as shown in the drawings.

The front and rear triangular portions 36 and 38 are preferably sized to allow at least one-half, and preferably approximately two-thirds, of the cutting blade 12 to be exposed and open to clear inspection, touch and evaluation by a viewer. The front triangular portions 36 and 38 preferably include respective stiffening ribs 68 and 70 to minimize the tendency of the triangular portions 36 and 38 to unduly flex or bend and further to enhance the durability of the display package 10.

As can be readily seen in FIGS. 1 through 3, the front and rear body portions 20 and 22 include hang-holes 64 that are aligned with each other when the display package 10 is in its closed position, thus allowing the display package 10 to be hung on a peg, nail, hook or other external protruding member for display purposes in a commercial establishment as well as for storage and blade identification purposes by the user in his or her own facility. In this regard, the hang-holes 64 are preferably surrounded by hang-hole reinforcing bosses 66 in order to further enhance the strength and durability of the display package 10.

Preferably the front and rear body portions 20 and 22 are initially secured to each other by frangible attachments 60, which can be ultrasonic welds or other such well-known attachments. These attachments 60, or the material around them, are designed to be easily broken by the user without destroying or unduly damaging the package 10. Thereafter, the display package 10 is reusable and repeatedly reclosable and reopenable as described above.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

We claim:

1. A reusable package for displaying, holding and storing a generally disc-shaped two-sided display item in a partially exposed condition, the display item having a central aperture therethrough and at least one surface discontinuity thereon, said package comprising a front body portion and a rear body portion each of which having inner and outer sides and being hingedly interconnected with each other in order to be selectively foldable relative to each other between a fully closed position with their respective inner sides in a generally face-to-face abutting relationship and a fully open position with their respective inner sides being separated and generally coplanar, at least said front body portion being at least partially transparent in order to allow a viewer to see the display item therethrough, said front and rear body portions having complementary closure portions formed therein, said closure portions being mutually engageable in a gripping and releasable relationship with each other within and through the central aperture of the display item when said front and rear body portions are folded to said closed position with the display item disposed therebetween in order to releasably secure said front and rear body portions in said closed position, at least one of said front and rear body portions having an anti-rotation lug protruding therefrom and being engageable with the surface discontinuity on the display item in order to substantially prevent the display item from rotating about its central aperture when said front and rear body portions are in said closed position with the display item disposed therebetween, said front and rear body portions covering less than all of the disc-shaped display item in order for both sides of the display item to be partially exposed when said front and rear body portions are in said closed position, said front and rear body portions each including a header portion and a generally triangular support portion, said respective front and rear header portions being generally complementary in size and shape and being mutually engageable with each other when said body portions are in said closed position, said front and rear header portions including respective dished portions releasably nestable with each other when said front and rear body portions are in said closed position, and said respective front and rear support portions being generally complementary in size and shape and mutually engageable with each other when said body portions are in said closed position, said closure portions including a closure post on one of said support portions and a complementary closure recess on the other of said support portions, said closure post and said closure recess being grippingly and releasably nestable with each other in order to releasably secure said front and rear body portions in said closed position, said front and rear triangular support portions each further including stiffening ribs formed therein and extending along respective sides thereof from a location generally adjacent said respective header portions to a location generally adjacent the respective apexes of said triangular support portions, said stiffening ribs on each of said front and rear support portions intersecting one another and extending around at least part of said closure portions.

2. A reusable package according to claim 1, wherein the display item is generally circular and disk-like, the surface discontinuity being on at least one side thereof at a location generally adjacent an outer periphery thereof.

3. A reusable package according to claim 2, wherein the display item is a circular cutting blade, the surface discontinuity being formed by a circumferential space between two adjacent teeth of said cutting blade.

4. A reusable package according to claim 1, wherein said closure post and said closure recess are located generally adjacent said respective apexes of said respective support portions.

5. A reusable package according to claim 1, wherein said front and rear support portions cover less than one-half of the display item when said front and rear body portions are in said closed position with said display item held therebetween.

6. A reusable package according to claim 1, wherein said front and rear support portions cover approximately one-third of the display item when said front and rear body portions are in said closed position with said display item held therebetween.

7. A reusable package according to claim 14, wherein said rear header portion also includes a second rear dished portion formed therein and opening generally forwardly when said front and rear body portions are in said closed position, said second rear dished portion and said front dished portion forming a cavity therebetween.

8. A reusable package according to claim 7, further comprising an insert card and an anti-theft security member removably disposed within said cavity when said front and rear body portions are in said closed position.

9. A reusable package according to claim 9, further comprising a second insert card removably disposed within said cavity when said front and rear body portions are in said closed position, said security member being concealed from view between said insert cards.

10. A reusable package according to claim 7, wherein said insert card has product information about the display item printed thereon.

11. A reusable package according to claim 1, wherein said front and rear body portions are initially attached to each other through the central aperture of the display item to secure them in said closed position with the display item disposed therebetween, said attachment being frangible in order to allow said front and rear body portions to be unfolded from each other for selective removal of the display item, said closure portions being grippingly and releasably nestable with each other in order to releasably secure said front and rear body portions in said closed position after said frangible attachment has been broken.

12. A reusable package according to claim 1, further comprising at least one hang-hole extending through each of said front and rear body portions, said hang-holes being aligned with each other when said front and rear body portions are in said closed position in order to allow said package to be hung on an external protruding member.

13. A reusable package according to claim 1, wherein the other of said front and rear body portions has a second anti-rotation lug protruding therefrom, said second anti-rotation lug being located at a position relative to said closure portions that is different from the position of said first anti-rotation lug relative to said closure portions in order to be engageable with a surface discontinuity on a different display item, thereby allowing said package to be used with at least two different display items.

14. A reusable package according to claim 13, wherein said second anti-rotation lug is located at a position farther away from said closure portions than said first anti-rotation lug in order to allow said package to be used interchangeably with display items having different diameters.

15. A reusable package for displaying, holding and storing a circular blade, the blade having a central aperture therethrough and at least one surface discontinuity thereon formed between two adjacent blade teeth, said package comprising a front body portion and a rear body portion each of which having inner and outer sides and being hingedly interconnected with each other in order to be selectively foldable relative to each other between a fully closed position with their respective inner sides in a generally face-to-face abutting relationship and a fully open position with their respective inner sides being separated and generally coplanar, at least said front body portion being at least partially transparent in order to allow a viewer to see the blade therethrough, said front and rear body portions having complementary closure portions formed therein, said closure portions being mutually engageable in a gripping and releasable relationship with each other within and through the central aperture of the blade when said front and rear body portions are folded to said closed position with the blade disposed therebetween in order to releasably secure said front and rear body portions in said closed position, at least one of said front and rear body portions having an anti-rotation lug protruding therefrom and being engageable with the surface discontinuity on the blade in order to substantially prevent the blade from rotating with respect to said front and rear body portions when in said closed position with the blade disposed therebetween, said front and rear body portions each including a header portion and a generally triangular support portion, said respective front and rear header portions being generally complementary in size and shape and being mutually engageable with each other when said body portions are in said closed position, said front and rear header portions including respective dished portions releasably nestable with each other when said front and rear body portions are in said closed position, and said respective front and rear support portions being generally complementary in size and shape and being mutually engageable with each other when said body portions are in said closed position, said closure portions including a closure post on one of said support portions and a complementary closure recess on the other of said support portions, said closure post and said closure recess being located generally adjacent the respective apexes of said respective support portions and being grippingly and releasably nestable with each other in order to releasably secure said front and rear body portions in said closed position, said front and rear triangular support portions each further including stiffening ribs formed therein and extending along respective sides thereof from a location generally adjacent said respective header portions to a location generally adjacent the respective apexes of said triangular support portions, said rear header portion also having a second rear dished portion formed therein and recessed rearwardly therein, said second rear dished portion and said front dished portion forming a cavity therebetween when said front and rear body portions are in said closed position, said front and rear body portions being initially attached to each other to secure them in said closed portion with the blade disposed therebetween, said attachment being frangible in order to allow said front and rear body portions to be unfolded from each other for selective removal of the blade, said closure portions being grippingly and releasably nestable with each other in order to releasably secure said front and rear body portions in said closed position after said frangible attachment has been broken, and the other of said front and rear body portions has a second anti-rotation lug protruding therefrom, said second anti-rotation lug being located at a position farther from said closure portions than said first anti-rotation lug in order to allow said package to be used interchangeably with at least two different blades having different diameters.

16. A reusable package according to claim 15, further comprising at least one hang-hole extending through each of said front and rear body portions, said hang-holes being aligned with each other when said front and rear body portions are in said closed position in order to allow said package to be hung on an external protruding member.

17. A reusable package according to claim 16, wherein each of said hang-holes is surrounded by a reinforcing boss formed in the respective body portion.

18. A reusable package according to claim 15, further comprising an insert card and an anti-theft security member removably disposed within said cavity when said front and rear body portions are in said closed position.

19. A reusable package according to claim 18, further comprising a second insert card removably disposed within said cavity when said front and rear body portions are in said closed position, said security member being concealed from view between said insert cards.

20. A reusable package according to claim 19, wherein said insert card has product information about the blade item printed thereon.

\* \* \* \* \*

UNITED STATES PATENT AND TRADEMARK OFFICE
CERTIFICATE OF CORRECTION

PATENT NO.    : 6,161,693
DATED         : December 19, 2000
INVENTOR(S)   : Daniel G. Findle et al.

Page 1 of 1

It is certified that error appears in the above-identified patent and that said Letters Patent is hereby corrected as shown below:

<u>Column 6, claim 7,</u>
Line 6, "claim 14" should be -- claim 1 --.

<u>Column 6, claim 9,</u>
Line 16, "claim 9" should be -- claim 8 --.

Signed and Sealed this

Twenty-second Day of January, 2002

Attest:

JAMES E. ROGAN
*Attesting Officer*  *Director of the United States Patent and Trademark Office*